Patented July 6, 1937

2,086,032

UNITED STATES PATENT OFFICE 2,086,032

COPYING PAD AND METHOD OF PREPARING THE SAME

William Hoskins, Jr., La Grange, Ill., assignor to Ditto, Incorporated, a corporation of West Virginia No Drawing. Application November 6, 1935, Serial No. 48,495

9 Claims. (Cl. 41—31.6)

The present invention relates to improved hectograph copying pads or similar gelatinous copying pads and to methods of preparing the same.

In accordance with the present invention, I employ, as a constituent of a gelatinous copying pad of the hectograph type, a glyceride of starch, which is incorporated in suitable proportions in an aqueous gelatinous mass. The starch glyceride which is employed in this composition may be prepared from an ordinary starch, such as potato starch, corn starch or the like, but is preferably prepared from a soluble starch and most suitably from a chlorine-treated starch, although other soluble starches may be employed.

In the preparation of gelatinous masses for copying pads, in order to secure products capable of producing copies of desirable character and brightness it has hitherto been necessary to employ commercial glues, and these are difficult to secure of constant composition and properties. The purer gelatins, such as the edible grades, have not been found satisfactory hitherto for the preparation of copying pads or masses by reason of the much weaker and poorer copies produced from them. By the use of the present invention, the purer gelatins, may be employed in the preparation of the gelatinous masses for the copying pads, and greater uniformity and constancy in composition and characteristics of the products and improvement in copies made by its use can be secured. By the use of the present invention, it is also possible to secure with such gelatin a copying pad or mass having a greater stability and resistance to variations in weather conditions, and to secure and retain better copy strength and brighter copies in the use of the pad. When the present invention is employed in the preparation of a glue-containing pad or copying mass, there is a similar improvement in the product and in copies made from it.

In carrying out the present invention, I prepare a glyceride of starch for incorporation into the copying mass by heating together suitable quantities of the selected starch and glycerine, with or without water. Although starch itself can be employed, as hereinbefore stated, it is preferred to employ a soluble starch and preferably a chlorine-treated starch, such as that commercially designated "chlorinated starch".

Thus, I may employ a mixture of 40 to 50 parts by weight of chlorinated starch such as that hereinbefore referred to with from 30 to 60 parts of water and from 90 to 150 parts of glycerin.

The proportion of glycerin employed in preparing the starch glyceride may be varied widely, providing sufficient is employed so that the resulting glyceride mixture is not too stiff or viscous, since variations in the proportion of glycerin used in preparing the glyceride mixture may be compensated for in the proportions of glycerin which are employed in the final composition of the gelatinous mass constituting the copying pad.

In case ordinary starch is employed instead of a soluble starch, such as the chlorinated starch above referred to, a smaller proportion of starch relative to water is preferably employed in the mixture. Thus, in a glyceride mixture such as that hereinbefore referred to, when using ordinary starch, from 30 to 40 parts by weight of the starch would be employed. When using ordinary starch, smaller quantities are required than of the chlorinated or other soluble starch to secure the desired viscosity in the product. The chlorinated or other soluble starch is preferred, since the copying mass produced then has less tendency to tackiness than when ordinary starch is employed in preparing the glyceride composition.

The starch-glyceride mixture having a composition as hereinbefore set forth is heated and maintained at a temperature of at least 65° C. and preferably at from 90 to 100° C. for water-containing mixtures such as are hereinafter described until it reacts to become a translucent mass.

If desired, the water can be entirely eliminated in the preparation of the starch-glyceride composition. Thus, the starch-glyceride may be prepared by admixing 40 to 50 parts of starch with 100 to 250 parts or more of glycerin and heating the mixture to a temperature of 100 to 140° C. until it becomes translucent. Or if desired, the water may be only partially eliminated, but as the proportion is reduced substantially below an amount equal in weight to that of the starch, the proportion of starch relative to glycerin in the starch-glyceride mixture should be increased.

The starch-glyceride thus prepared is then incorporated into the gelatinous mass which forms the copy pad. In preparing this mass, although glue or technical gelatin may be employed, I prefer to use a gelatin of sufficient purity to be standardized by the use of the standard jelly test. Thus I have found a gelatin with a Bloom jelly test of 225 grams to be satisfactory for use. Gelatins with a greater or less jelly test may be employed, if desired, suitable compensation being made in the proportions of water, glycerin and other constituents of the mixture.

In preparing the copy mass or pad composition in accordance with the present invention, I may employ, to 1 part by weight of gelatin, 8 to 16 parts by weight of glycerin, 1 to 3 parts by weight of water, and sufficient starch-glyceride prepared as hereinbefore described to provide in the final composition 0.1 to 1.5 parts by weight of starch or soluble starch such as chlorinated starch. A suitable composition for ordinary climatic conditions in the Temperate Zones, and such as those maintained in ordinary offices in the fall, winter and spring, may be prepared from 1 part of gelatin, 15 parts of glycerin, 1 part of water and 1 part of the glyceride of starch. When a harder pad or mass is desired for warmer temperatures or for use in the tropics, the proportion of glycerin may be decreased. The variations in the proportion of the glyceride of starch affects the brightness of copies, the number of copies and the durability of the roll. Thus, with greater proportions of the glyceride of starch, brighter copies may be secured than with the proportion indicated above, but the number of copies which may be made may be slightly decreased and the durability of the composition may also be slightly decreased.

The proportions of glycerin in the gelatinous copy pad or mass will likewise be varied somewhat in accordance with the proportion of glycerin used in the preparation of the glyceride of starch and its viscosity, but such variations will be of a minor character.

Suitable quantities of tanning agents are also incorporated in the mixture. Although proportions of tanning agents, such as formaldehyde, aluminum alums or chrome alums may be employed in the mixture in proportions to secure effective tanning action without the use of light, it is preferred to employ minute porportions of light-sensitive tanning agents such as potassium or ammonium dichromate and subsequently effecting tanning or the gelatinous mass in the presence of light, as set forth in the prior application of William B. Whitmore, Serial No. 684,765, filed August 11, 1933. Thus from 0.001 to 0.1% of potassium dichromate may be incorporated in the gelatinous mass.

In preparing the gelatinous mass containing the starch-glyceride composition, the gelatin is mixed with the water and a part of the glycerin is dissolved while warm, say at a temperature of 125 to 130° F. or higher. In general, temperatures of up to 145 to 150° F. may be employed, although higher temperatures may be used if desired. After the gelatin is dissolved, the remainder of the glycerin and the starch-glyceride are incorporated, preferably preheated to a temperature approximately that of the gelatin solution. After thorough admixture of the solution of the constituents has been effected, and the tanning agent incorporated in the desired amount, the mixture is cooled to a coating temperature, say 110 to 120° F. and then cast in pads or coated upon a suitably prepared fabric, paper or other backing. In the preparation of rolls, this operation is continuous. After the coating or casting operation, the mixture is cooled, suitably in continuous movement on its backing in the preparation of a roll product, and if a light-sensitive tanning agent is employed, is then treated with sun-light or other active light such as ultra-violet light to effect the desired tanning of the mass. By employing starch-glyceride as hereinbefore described, a greater brightness of copy is secured. The roll is likewise less sensitive to ordinary changes in temperature and its copying properties are less affected by accidental drying out of the mass that may occur between uses.

These advantages may likewise be secured in pads made with commercial or technical glues, the glue being incorporated in the mixture in place of the gelatin as hereinbefore set forth, but with somewhat lower relative proportions of glycerin, due to the lower jelly strength of the glue.

I claim:

1. A gelatinous copying pad comprising gelatin and glyceride of chlorinated starch.

2. A tanned gelatinous copying pad comprising purified gelatin, glyceride of chlorinated starch, and glycerin.

3. A gelatinous copying pad comprising 1 part of gelatin, 0.1 to 1.5 parts of chlorinated starch as glyceride of chlorinated starch, 8 to 16 parts of glycerin and 1 to 3 parts of water.

4. The method of preparing a gelatinous copy mass which comprises incorporating glyceride of chlorinated starch into an aqueous solution of gelatin containing glycerin.

5. The method of preparing a gelatinous copy mass which comprises incorporating a glyceride of chlorinated starch into an aqueous solution of gelatin containing glycerin, incorporating a light-sensitive tanning agent therein, forming the resulting mass and subjecting it to the action of active light rays.

6. The method of preparing a glyceride of chlorinated starch comprising heating chlorinated starch with glycerin until a translucent mixture is secured.

7. The method of forming a glyceride of starch which comprises heating chlorinated starch with glycerin in the presence of water until a translucent mixture is secured.

8. A gelatinous copying pad comprising 1 part of glue, 0.1 to 1.5 parts of starch as glyceride of starch, 8 to 16 parts of glycerin and 1 to 3 parts of water.

9. A gelatinous copying pad comprising 1 part of gelatin, 0.1 to 1.5 parts of starch as glyceride of starch, 8 to 16 parts of glycerin and 1 to 3 parts of water.

WILLIAM HOSKINS, Jr.